(12) United States Patent
Kawagishi et al.

(10) Patent No.: US 11,365,281 B2
(45) Date of Patent: Jun. 21, 2022

(54) COATING COMPOSITION AND COATING METHOD

(71) Applicant: KANSAI PAINT CO., LTD., Hyogo (JP)

(72) Inventors: Mayu Kawagishi, Kanagawa (JP); Katsuto Komura, Kanagawa (JP)

(73) Assignee: KANSAI PAINT CO., LTD., Hyogo (JP)

( * ) Notice: Subject to any disclaimer, the term of this patent is extended or adjusted under 35 U.S.C. 154(b) by 203 days.

(21) Appl. No.: 16/599,817

(22) Filed: Oct. 11, 2019

(65) Prior Publication Data

US 2020/0123306 A1    Apr. 23, 2020

(30) Foreign Application Priority Data

Oct. 22, 2018   (JP) .............................. JP2018-198671

(51) Int. Cl.
| | |
|---|---|
| C09D 175/06 | (2006.01) |
| C08G 18/80 | (2006.01) |
| C08G 18/48 | (2006.01) |
| C08G 18/42 | (2006.01) |
| C08G 18/76 | (2006.01) |
| C08G 18/18 | (2006.01) |
| C09D 175/08 | (2006.01) |

(52) U.S. Cl.
CPC ..... C08G 18/8077 (2013.01); C08G 18/1816 (2013.01); C08G 18/42 (2013.01);
(Continued)

(58) Field of Classification Search
CPC ............ C08G 18/8077; C08G 18/4854; C08G 18/42; C08G 18/7614; C08G 18/7642;
(Continued)

(56) References Cited

U.S. PATENT DOCUMENTS 4,719,267 A * 1/1988 Rizk .................... C09K 3/1021
                                                                525/453
5,071,937 A * 12/1991 Potter ................ C08G 18/3237
                                                                528/45
(Continued)

FOREIGN PATENT DOCUMENTS

JP         0286641     *  3/1990   .......... C09D 175/04
JP     10-292025 A    11/1998
(Continued)

OTHER PUBLICATIONS

JP-0286641_03-1990_English Translation.*
Communication dated Apr. 21, 2020 from the Japanese Patent Office in counterpart application No. 2019-171371.

*Primary Examiner* — Michael L Leonard
(74) *Attorney, Agent, or Firm* — Sughrue Mion, PLLC (57) ABSTRACT

A coating composition includes a blocked urethane elastomer (A) containing a terminal isocyanate group blocked with an oxime compound and having a number average molecular weight of 800 to 5,000, an aromatic diamine compound (B) containing an electron-donating group, and an amide compound (C). An equivalent ratio (amino group/isocyanate group) of the amino group of the aromatic diamine compound (B) to the isocyanate group of the blocked urethane elastomer (A) is within a range of 1.0 to 2.0. A solid content of the amide compound (C) is within a range of 0.5 mass % to 5 mass % based on a total solid content of the blocked urethane elastomer (A) and the aromatic diamine compound (B).

3 Claims, 4 Drawing Sheets

(52) U.S. Cl.
CPC ..... *C08G 18/4854* (2013.01); *C08G 18/7614* (2013.01); *C08G 18/7642* (2013.01); *C08G 18/7671* (2013.01); *C09D 175/06* (2013.01); *C09D 175/08* (2013.01)

(58) Field of Classification Search
CPC ............ C08G 18/1816; C08G 18/7671; C09D 175/06; C09D 175/04
See application file for complete search history.

(56) References Cited

U.S. PATENT DOCUMENTS

| | | | | |
|---|---|---|---|---|
| 5,106,675 | A * | 4/1992 | Ara | C09D 175/12 428/219 |
| 5,130,402 | A * | 7/1992 | Akiyama | C08G 18/10 524/101 |
| 5,508,370 | A * | 4/1996 | Reiff | C08G 18/8077 528/45 |
| 6,074,702 | A * | 6/2000 | Robinson | C08G 59/56 427/236 |
| 2014/0031500 | A1 * | 1/2014 | Matsumura | C08L 75/12 525/449 |

FOREIGN PATENT DOCUMENTS

| | | |
|---|---|---|
| JP | 2002-327039 A | 11/2002 |
| JP | 2007091845 A | 4/2007 |
| JP | 2012021113 A | 2/2012 |

* cited by examiner

COATING COMPOSITION AND COATING METHOD

CROSS-REFERENCE TO RELATED APPLICATIONS

This application claims priority from Japanese Patent Application No. 2018-198671 filed on Oct. 22, 2018, the entire subject matter of which is incorporated herein by reference.

BACKGROUND OF INVENTION

Technical Field

The present invention relates to a coating composition having excellent coating performance such as storage stability, curability, erosion resistance, adhesiveness to an object to be coated, and chemical resistance, and also having excellent coating workability. The present invention also relates to an article coated with the coating composition and a coating method using the coating composition.

Background Art

In coating of industrial products such as components of large-sized machine/machinery such as transportation machines such as vehicle bodies and vehicles, construction machinery, and industrial machinery, there is a demand of stable excellent performances for coatings and coating films from the viewpoint of energy saving, reduction of environmental load and cost or the like.

Examples of composition used for coating of the above industrial products include urethane compositions. The urethane compositions are widely used for coating applications of industrial products due to their superior flexibility.

The urethane composition is roughly classified into two groups: two-component urethanes which are used by mixing a main agent containing an isocyanate-terminated urethane prepolymer as a main component and a curing agent containing an active hydrogen compound such as polyol and amine as a main component, and curing the mixture; and one-component urethanes which are used by reacting an isocyanate-terminated urethane prepolymer with an amine compound dissociated by moisture in the air or the moisture on objects to be coated, followed by curing the reaction product.

As an example of the two-component urethanes, for example, Patent Literature 1 discloses a two-component curing urethane composition containing a main agent containing, as a main component, a urethane prepolymer (A) having two or more isocyanate groups at a terminal, and a curing agent containing a latent crosslinking agent (B) and an active hydrogen compound (C) as main components, and a coating material using the composition.

As an example of the one-component urethanes, Patent Literature 2 discloses a heat-curable urethane composition containing at least (A) a urethane prepolymer having a terminal isocyanate group blocked, (B) an amine-based curing agent having two or more amino groups in one molecule, (C) a heat-expandable microcapsule, and (D) a calcium oxide.

Patent Literature 1: JP H10-292025 A
Patent Literature 2: JP 2002-327039 A

SUMMARY OF INVENTION

However, none of the urethane compositions disclosed in Patent Literatures 1 and 2 can satisfy all of coating performance such as storage stability, curability, erosion resistance, adhesiveness to an object to be coated, and chemical resistance, and coating workability.

The present invention is made in view of the above findings, and an object of the present invention is to provide a coating composition excellent in coating performance such as storage stability, curability, erosion resistance, adhesiveness to an object to be coated, and chemical resistance, and coating workability by using the specific urethane composition.

As a result of intensive studies to solve the above problems, the present inventors have found that the above problems can be solved by the coating composition containing a blocked urethane elastomer (A) containing a terminal isocyanate group blocked with an oxime compound and having a molecular weight in a specific range, an aromatic diamine compound (B) containing an electron-donating group, and an amide compound (C), and the present invention has been completed.

That is, the present invention encompasses the following aspects.

(1) A coating composition, including: a blocked urethane elastomer (A) containing a terminal isocyanate group blocked with an oxime compound and having a number average molecular weight of 800 to 5,000; an aromatic diamine compound (B) containing an electron-donating group; and an amide compound (C), wherein an equivalent ratio (amino group/isocyanate group) of an amino group of the aromatic diamine compound (B) to an isocyanate group of the blocked urethane elastomer (A) is within a range of 1.0 to 2.0, and a solid content of the amide compound (C) is within a range of 0.5 mass % to 5 mass % based on a total solid content of the blocked urethane elastomer (A) and the aromatic diamine compound (B).

(2) An article coated with the coating composition according to the above (1).

(3) A coating method, including coating an object with a coating composition obtained by mixing a main agent and a curing agent, wherein the main agent includes a blocked urethane elastomer (A) containing a terminal isocyanate group blocked with an oxime compound and having a number average molecular weight of 800 to 5,000, the curing agent includes an aromatic diamine compound (B) containing an electron-donating group, an amide compound (C) is contained in at least one of the main agent and the curing agent, an equivalent ratio (amino group/isocyanate group) of an amino group of the aromatic diamine compound (B) to an isocyanate group of the blocked urethane elastomer (A) is within a range of 1.0 to 2.0, and a solid content of the amide compound (C) is within a range of 0.5 mass % to 5 mass % based on a total solid content of the blocked urethane elastomer (A) and the aromatic diamine compound (B).

The coating composition in the present invention contains a blocked urethane elastomer (A) containing a terminal isocyanate group blocked with an oxime compound and having a molecular weight in a specific range as a main agent component, and an aromatic diamine compound (B) containing an electron-donating group as a curing agent component, and thus, the coating composition is excellent in coating performance such as storage stability and curability.

In addition, since the amide compound (C) is contained, the pot life (working life) is improved and the coating workability such as sagging resistance is excellent without deteriorating the above performance. As a result, a coated article having excellent coating performances such as erosion resistance, adhesiveness to an object to be coated, and chemical resistance, in addition to the storage stability and curability, can be efficiently prepared.

DETAILED DESCRIPTION OF THE INVENTION

The coating composition in the present invention is a coating composition containing a blocked urethane elastomer (A) containing a terminal isocyanate group blocked with an oxime compound and having a molecular weight in a specific range, an aromatic diamine compound (B) containing an electron-donating group, and an amide compound (C).

Hereinafter, the coating composition in one embodiment is described in detail.

Blocked Urethane Elastomer (A)

Urethane prepolymer used to obtain a blocked urethane elastomer (A) containing a terminal isocyanate group blocked with an oxime compound (hereinafter, sometimes simply referred to as "blocked urethane elastomer (A)") can be usually synthesized from a polyol compound and a polyisocyanate compound.

The polyol compound is a general term for alcohols in which a plurality of hydrogen atoms of a hydrocarbon are substituted with hydroxyl groups, and specific examples thereof include compounds obtained by addition polymerization of one or more alkylene oxides such as ethylene oxide, propylene oxide, butylene oxide, and tetrahydrofuran to a compound having two or more active hydrogens.

Examples of the compound having two or more active hydrogens include polyhydric alcohols, amines, polyhydric phenols, and the like.

Examples of the polyhydric alcohols include ethylene glycol, propylene glycol, butanediol, diethylene glycol, glycerin, hexanetriol, trimethylolpropane, pentaerythritol, and the like.

Examples of the amines include ethylenediamine, hexamethylenediamine, ethanolamine, propanolamine, and the like.

Examples of the polyhydric phenols include resorcin, bisphenol compounds, and the like.

Specific examples of the polyol compounds include polyether polyols such as polytetramethylene glycol (PTMG), polyethylene glycol, polypropylene glycol, polyoxypropylene glycol, and polyoxybutylene glycol, polyolefin polyols such as polybutadiene polyol and polyisoprene polyol, polyester polyols such as adipate polyol, lactone polyol, castor oil, and the like.

These polyol compounds may be used alone, or two or more thereof may be used in combination.

As the polyol compounds, from the viewpoint of erosion resistance, polyether polyols and polyester polyols are preferable, and among the polyether polyols, polytetramethylene glycol and polypropylene glycol may be particularly preferably used.

The number average molecular weight of the polyol compounds is preferably 500 or more, and more preferably 1,500 or more, and is preferably 3,000 or less, from the viewpoint of erosion resistance.

The number average molecular weight in the present specification is a value calculated based on the molecular weight of the standard polystyrene from the chromatogram measured by gel permeation chromatography (GPC) in accordance with the method described in JIS K 0124-2011. As the gel permeation chromatograph, "HLC-8120GPC" (tradename; manufactured by Tosoh Corporation, and HLC being registered trademark) is used. As the column, four of "TSKgel G-4000 HXL", "TSKgel G-3000 HXL", "TSKgel G-2500HXL", and "TSKgel G-2000 HXL" (tradenames; all manufactured by Tosoh Corporation, and TSKgel being registered trademark) are used, and the measurement is carried out under the conditions (mobile phase: tetrahydrofuran, measurement temperature: 40° C., flow rate: 1 ml/min, and detector: refractive index detector (RI)).

As the polyisocyanate compounds, those used for preparing common polyurethane resins may be used. Specific examples thereof include 2,4-tolylene diisocyanate (2,4-TDI), 2,6-tolylene diisocyanate (2,6-TDI), diphenylmethane-4,4'-diisocyanate (MDI) and modified products thereof, 1,5-naphthalene diisocyanate, ethylene diisocyanate, propylene diisocyanate, tetramethylene diisocyanate, hexamethylene diisocyanate, isophorone diisocyanate, xylylene diisocyanate (XDI), triphenyl methane triisocyanate, and the like. These polyisocyanate compounds may be used alone or two or more thereof may be used in combination.

As the polyisocyanate compounds, from the viewpoint of adhesiveness to an object to be coated, 2,4-tolylene diisocyanate, 2,6-tolylene diisocyanate, diphenylmethane-4,4'-diisocyanate, and modified products thereof, isophorone diisocyanate and xylylene diisocyanate are preferable, and 2,4-tolylene diisocyanate, 2,6-tolylene diisocyanate, diphenylmethane-4,4'-diisocyanate, and modified products thereof may be particularly suitably used.

As the polyisocyanate compounds, from the viewpoint of adhesiveness to an object to be coated, monomeric isocyanates and polymeric isocyanates having preferably two or more isocyanate functional groups in average, those having preferably 6 or less isocyanate functional groups in average, and those having more preferably 4 or less isocyanate functional groups in average may be used.

The amount ratio of the polyol compound to the polyisocyanate compound in the preparation of the urethane prepolymer of the blocked urethane elastomer (A) is usually preferably an amount ratio of one or less hydroxyl groups in the polyol compound per isocyanate group in the polyisocyanate compound.

The preparation of the urethane prepolymer can be carried out under common preparation conditions for the urethane prepolymer. Specifically, for example, the polyol compound is allowed to react with the polyisocyanate compound at a reaction temperature of about 50° C. to 100° C. under normal pressure, thereby preparing a urethane prepolymer. The obtained urethane prepolymer is allowed to react with an isocyanate blocking agent to block a terminal isocyanate group, thereby preparing a blocked urethane elastomer (A).

The amount of the isocyanate blocking agent may be such that the functional group that reacts with the isocyanate group in the blocking agent to block the isocyanate group is at least the same amount as the isocyanate group.

The isocyanate blocking agent for the blocked urethane elastomer (A) is an oxime compound.

Examples of the oxime compound include methyl ethyl ketone oxime, methyl amyl ketone oxime, cyclohexanone oxime, and the like.

The blocked urethane elastomer (A) is cured as follows: the blocking agent is dissociated by heating to regenerate an isocyanate group, and the regenerated isocyanate group is reacted with a curing agent, thereby curing the blocked urethane elastomer (A).

The number average molecular weight of the blocked urethane elastomer (A) is 800 to 5,000, and is preferably 1,800 or more and 3,500 or less, from the viewpoint of erosion resistance.

When the number average molecular weight is 800 or more, the flexibility is improved and the erosion resistance is satisfactory. When the number average molecular weight is 5,000 or less, the erosion resistance can be prevented from decreasing due to a decrease in crosslinking density.

The glass transition temperature (Tg) of the blocked urethane elastomer (A) is preferably −80° C. or more, more preferably −70° C. or more, and is preferably 0° C. or less, more preferably −30° C. or less, and even more preferably −50° C. or less, from the viewpoint of erosion resistance.

In the present specification, the glass transition temperature (Tg) of the blocked urethane elastomer (A) is determined by the measurement using differential thermal analysis (DSC). Specifically, the glass transition temperature can be measured as follows: using a differential scanning calorimeter "DSC-220U" (tradename; manufactured by Seiko Instruments), a sample is put in a measurement cup, and a solvent is completely removed by vacuum suction, and then, a heat content change is measured in the range of −100° C. to +200° C. at a temperature raising rate of 3° C./min, and the change point of a first baseline on the low temperature side is determined as the glass transition temperature.

Aromatic Diamine Compound (B)

The aromatic diamine compound (B) containing an electron-donating group (hereinafter, sometimes simply referred to as "aromatic diamine compound (B)") is an aromatic compound having two amino groups in one molecule and having an electron-donating group (excluding an amino group).

Examples of the electron-donating group include an alkyl group, a hydroxyl group, an alkoxy group, and the like. Among the electron-donating groups, an alkyl group is preferable from the viewpoint of adhesiveness to an object to be coated.

Specific examples of the aromatic diamine compound (B) include tolylenediamine (e.g. 2,3-tolylenediamine, 2,4-tolylenediamine, 2,5-tolylenediamine, 2,6-tolylene diamine, and 3,4-tolylenediamine), diethyltoluenediamine, xylene diamine, and xylene diamine, alkyl-substituted diamino diphenyl methane (e.g. 4,4'-diaminodiphenylmethane, 2,4'-diaminodiphenylmethane, 3,3'-diaminobiphenyl methane, and 3,4'-diaminodiphenylmethane) having an alkyl group in the aromatic nucleus, alkyl-substituted diaminobiphenyl (e.g. 2,2'-diaminobiphenyl, and 3,3'-diaminobiphenyl) having an alkyl group in the aromatic nucleus, alkyl-substituted phenylenediamine (e.g. o-phenylenediamine, m-phenylenediamine, and p-phenylenediamine) having an alkyl group in the aromatic nucleus, diaminophenol (e.g. 2,4-diaminophenol, and 2,5-diaminophenol), and the like.

Among the aromatic diamine compound (B), alkyl-substituted diamino diphenyl methane having an alkyl group in the aromatic nucleus is preferred from the viewpoint of adhesiveness to an object to be coated.

In alkyl-substituted diamino diphenyl methane having an alkyl group in the aromatic nucleus, the number of substituted alkyl groups is 1 or more, and is preferably 8 or less, and more preferably 4 or less. The position of the substituted alkyl group is preferably ortho with respect to the amino group.

As the alkyl-substituted diamino diphenyl methane having an alkyl group in the aromatic nucleus, specifically, 4,4'-diamino diphenyl methane in which the ortho position with respect to the amino group is substituted with an alkyl group is preferred. Specific examples thereof include 3,3', 5,5'-tetraalkyl-4,4'-diamino diphenyl methane, 3,3'-dialkyl-4,4'-diamino diphenyl methane, and the like. Among the above alkyl-substituted diamino diphenyl methane, 3,3',5,5'-tetraalkyl-4,4'-diaminodiphenylmethane is particularly preferred.

The substituted alkyl group is preferably an alkyl group having six or less carbon atoms. Specific examples thereof include a methyl group, an ethyl group, an n-propyl group, an isopropyl group, a t-butyl group, an n-butyl group, and the like. Among the substituted alkyl group, a methyl group and an ethyl group are particularly preferred.

Specific examples of the 3,3',5,5'-tetraalkyl-4,4'-diaminodiphenylmethane include 3,3'-dimethyl-5,5'-diethyl-4,4'-diaminodiphenylmethane, 3,3',5,5'-tetraethyl-4,4'-diaminodiphenylmethane, and the like.

Specific examples of 3,3'-dialkyl-4,4'-diaminodiphenylmethane includes 3,3'-diethyl-4,4'-diaminodiphenylmethane, 3,3'-dimethyl-4, 4'-diaminodiphenylmethane, 3,3'-diisopropyl-4,4'-diaminodiphenylmethane, and the like.

Among the 3,3',5,5'-tetraalkyl-4,4'-diaminodiphenylmethane and 3,3'-dialkyl-4,4'-diaminodiphenylmethane, 3,3'-dimethyl-5,5'-diethyl-4,4'-diaminodiphenylmethane and/or 3,3'-diethyl-4,4'-diaminodiphenylmethane are particularly preferred.

The aromatic diamine compound (B) may be used alone or two or more thereof may be used in combination.

From the viewpoint of coating performance such as erosion resistance and adhesiveness to an object to be coated, the content of the aromatic diamine compound (B) in the coating composition is such that the equivalent ratio (amino group/isocyanate group) of the amino group of the aromatic diamine compound (B) to the isocyanate group of the blocked urethane elastomer (A) is 1.0 or more, preferably 1.05 or more and more preferably 1.1 or more, and is 2.0 or less, preferably 1.8 or less, and more preferably 1.5 or less.

The coating composition is excellent in coating performance such as storage stability, curability, erosion resistance, adhesiveness to an object to be coated, and chemical resistance, and coating workability because the coating composition contains the blocked urethane elastomer (A) containing a terminal isocyanate group blocked with an oxime compound and having a molecular weight in a specific range, as the main agent, and the aromatic diamine compound (B) containing an electron-donating group as the curing agent.

In the present specification, the term "being excellent in curability" means that the following state is achieved: even if a load is applied to a coated surface, any impression is not formed on the coated surface, because under the specific baking condition, blocking of an isocyanate group of the blocked urethane elastomer (A) is dissociated and the isocyanate group is regenerated, and the regenerated isocyanate group is reacted with an amine of the aromatic diamine compound (B) as a curing agent, thereby forming a coated film. Although the specific evaluation about the curability is not performed for the coating composition, it is considered that reaction of the isocyanate group with the amine rapidly proceeds by using the blocked urethane elastomer (A) and the aromatic diamine compound (B). It is assumed that the rapid reaction is achieved by the fact that the amine of the aromatic diamine compound (B) which is to be reacted with the isocyanate group of the blocked urethane elastomer (A) has an electron-donating group. Because of this, the coating composition has curability equal to or more excellent than that of conventional coating compositions.

In addition, although the specific evaluation about chemical resistance is not performed for the coating composition, the coating composition has chemical resistance equal to or more excellent than that of conventional coating compositions. This is because urea bonds formed by the reaction of the isocyanate group of the blocked urethane elastomer (A) with the amine of the aromatic diamine compound (B) form a hydrogen bond, and cohesive force at a crosslinked point is very high due to interaction between aromatic rings of the aromatic diamine compounds (B). In addition, since the reaction of the isocyanate group with the amine proceeds rapidly, crosslinked points are easily formed, and this fact also contributes to excellent chemical resistance.

Amide Compound (C)

The coating composition contains an amide compound (C) which is a rheology control agent (hereinafter, sometimes referred to as "RC agent") for the purpose of improving the coating workability through improvement of pot life (working life) and sagging resistance.

The amide compound (C) is a compound having a —NH—CO— bond in the molecule, and is added to the coating composition to exhibit thixotropy. The —NH—CO— bond is loosely bonded through a hydrogen bond to the isocyanate group of the blocked urethane elastomer (A) that has been regenerated by elimination of the blocking agent in the curing process, or to the urea group generated by the reaction with the diamine compound (B) in the curing process, thereby exhibiting viscosity.

As the amide compound (C), a compound commonly used as an amide-based wax may be used. Specific examples thereof include a fatty acid amide, an oligomer thereof, a modified product thereof (modified polyamide), and a mixture thereof as an active ingredient.

The fatty acid amide is a fatty acid amide obtained by reacting an amine with an aliphatic carboxylic acid. As the amine, diamines having 2 to 6 carbon atoms, such as ethylene diamine, 1,3-diaminopropane, 1,4-diaminobutane, and hexamethylene diamine, is preferably used, and in this case, an oligomer thereof is usually synthesized.

The aliphatic carboxylic acid may be a monocarboxylic acid having 2 to 18 carbon atoms. Usable examples thereof include dicarboxylic acids such as oxalic acid, succinic acid, fumaric acid, glutaric acid, adipic acid, suberic acid, azelaic acid, and sebacic acid, dimer acids obtained by polymerizing a fatty acids derived from natural fats and oils such as castor oil fatty acids with unsaturated fatty acids, and the like. In the case where the aliphatic carboxylic acid is an unsaturated carboxylic acid, it is preferable that the unsaturated carboxylic acid has been hydrogenated.

As the fatty acid amide, a commercially available product may be used. As the commercially available product of the fatty acid amide, powdered or paste fatty acid amide is commonly used. The paste fatty acid amide is generally diluted with a solvent such as xylene or alcohol.

Specific examples of the commercially available product of the fatty acid amide include a fatty acid amide paste type (DISPARLON 6900-20X, DISPARLON 6900-10X, DISPARLON A603-20X, DISPARLON A603-10X, DISPARLON A670-20M, DISPARLON 6810-20, DISPARLON 6850-20X, DISPARLON 6820-20M, DISPARLON 6820-10M, DISPARLON FS-6010, DISPARLON PFA-131, DISPARLON PFA-231, DISPARLON F-9020, DISPARLON F-9030, DISPARLON F-9040, DISPARLON F-9050, and the like), oxidized polyolefin amide (DISPARLON NS-5010, NS5025, DISPARLON NS-5210, DISPARLON NS-5310, and the like) (tradenames, all manufactured by Kusumoto Chemicals, and DISPARLON being registered trademark), higher fatty acid amide paste (Turlen series such as Turlen 7200-20, and Turlen 7500-20) (tradenames; all manufactured by Kyoeisha Chemicals), BYK-405 (manufactured by BYK-Chemie, and BYK being registered trademark), and A-S-A T-75F (tradename; manufactured by Ito-oilchem, and A-S-A being registered trademark), and the like.

Among the commercially available product of the fatty acid amide, a fatty acid amide paste type is preferably used from the viewpoint of coating workability, and particularly DISPARLON PFA-131, DISPARLON PFA-231, DISPARLON F-9020, DISPARLON F-9030, and DISPARLON F-9040 (tradenames, all manufactured by Kusumoto Chemicals, and DISPARLON being registered trademark) is suitably used.

The content of the amide compound (C) is preferably 0.5 mass % or more, more preferably 1 mass % or more, and more preferably 1.5 mass % or more, and is preferably 5 mass % or less, more preferably 4 mass % or less, and more preferably 3 mass % or less, based on the total solid content of the blocked urethane elastomer (A) and the aromatic diamine compound (B) from the viewpoints of sagging resistance and pot life.

In the present specification, the solid content means a residue obtained by removing a volatile component, and the residue may be a solid or a liquid at room temperature. The solid content mass can be calculated by taking the ratio of a mass of the remaining substance after drying to a mass before drying as the solid content rate, and multiplying the solid content rate by the sample mass before drying.

Pigment (D)

The coating composition preferably further contains a pigment (D) for rust prevention, coloring, and the like. Examples of the pigments include anti-rust pigments, coloring pigments, extender pigments, and the like. The pigment may be used alone, or two or more thereof may be used in combination.

Examples of the anti-rust pigments include zinc oxide, phosphite compound, phosphate compound, nitrite compound, molybdate compound, bismuth compound, metal ion exchange silica, and the like.

Examples of the coloring pigments include titanium oxide, zinc molybdate, calcium molybdate, carbon black, graphite, iron black, prussian blue, ultramarine, cobalt blue, copper phthalocyanine blue, indanthronered blue, chrome yellow, synthetic yellow iron oxide, bengara, transparent bengara, bismuth vanadate, titanium yellow, zinc yellow, ocher, monoazo yellow, disazo yellow, isoindolinone yellow, metal complex salt azo yellow, quinophthalone yellow, benzimidazolone yellow, monoazo red, unsubstituted quinacridone red, azo lake (Mn salt), quinacridone magenta, ansanthrone orange, dianthraquinonyl red, perylene maroon, perylene red, diketopyrrolopyrrole chromium vermilion, chlorinated phthalocyanine green, brominated phthalocyanine green, and the like; and pyrazolone orange, benzimidazolone orange, dioxazine violet, perylene violet, and the like.

Examples of the extender pigments include clay, silica, barium sulfate, talc, kaolin, barium carbonate, calcium carbonate, white carbon, diatomaceous earth, magnesium carbonate aluminum flake, mica flake, and the like.

When the coating composition contains the pigment (D), from the viewpoint of adhesiveness to an object to be coated, the total solid content of the pigment (D) is preferably 1 mass % or more, more preferably 3 mass % or more, and more preferably 5 mass % or more, and is preferably 40 mass % or less, more preferably 30 mass % or less, and is more preferably 20 mass % or less, based on the total solid content of the blocked urethane elastomer (A) and the aromatic diamine compound (B).

Other Optional Components

The coating composition may further contain compounds having reactivity with isocyanate groups (excluding the aromatic diamine compound (B)), fluororesins, and common coating additives as necessary. Examples of the common coating additives include ultraviolet absorbers (such as benzotriazole absorbers, triazine absorbers, salicylic acid derivative absorbers, and benzophenone absorbers), light stabilizers (such as hindered amines), matting agents, resin particles, rust inhibitors, chelating agents (such as acetylacetone), solvents, pigment dispersants, surface conditioners, defoaming agents, anti-settling agents, antioxidants, catalysts, thixotropic agents, and flame retardants.

Examples of the catalysts include metal catalysts such as dioctyltin dilaurate (DOTL), dibutyltin dilaurate (DBTL), zinc octylate, and organic bismuth compounds, and amine catalysts such as triethylenediamine and morpholine amine.

In addition, additives such as water repellents, antifouling agents, antiseptics, antibacterial agents, conductive agents and the like may also be included in order to impart functionality to the coating film surface within a range that does not impair the coating film performance.

Coating Composition

The form of the coating composition is not particularly limited, and may be any form of a water-based coating composition, an organic solvent-based coating composition, and a solvent-free coating composition. From the viewpoint of storage stability of the coating composition, an organic solvent-based coating composition or a non-aqueous dispersion-based coating composition is preferable.

In the present specification, the term "water-based coating composition" is a term contrasted with an organic solvent-based coating composition, and generally refers to a coating composition in which a coating film forming resin, a pigment, and the like is dispersed and/or dissolved in water or a medium (aqueous medium) containing water as a main component.

The organic solvent-based coating composition is a coating composition that substantially does not contain water as a solvent, or in which all or most of the solvent is an organic solvent. Examples of the organic solvent in the coating composition include: ketones such as acetone, methyl ethyl ketone, and methyl isobutyl ketone; esters such as ethyl acetate, butyl acetate, methyl benzoate, ethyl ethoxypropionate, ethyl propionate, and methyl propionate; ethers such as tetrahydrofuran, dioxane, and dimethoxyethane; glycol ethers such as ethylene glycol monomethyl ether, ethylene glycol monoethyl ether, diethylene glycol monomethyl ether, propylene glycol monomethyl ether acetate, and 3-methoxybutyl acetate; aromatic hydrocarbons, aliphatic hydrocarbons, and the like.

The organic solvent may be appropriately used alone or two or more thereof may be used in combination, depending on the purpose of adjusting the viscosity, adjusting the coating property, or the like.

The organic solvent preferably does not contain toluene, xylene, and the like from the viewpoint of the coating workability and the influence on a human body and the environment.

The solid content of the coating composition is preferably adjusted to 25 mass % or more, more preferably 30 mass % or more, and is preferably adjusted to 40 mass % or less, from the viewpoint of coating workability and reduction of the amount of organic solvent to be discharged.

From the viewpoint of storage stability and coating workability, the coating composition is preferably in the form of a two-component coating composition including a main agent containing a blocked urethane elastomer (A) and a curing agent containing an aromatic diamine compound (B), and is preferably used by mixing them immediately before use.

The amide compound (C) and the coating additive which may be optionally contained may be appropriately contained in the main agent and/or the curing agent. It is preferable that the amide compound (C) is contained in the main agent from the viewpoint of storage stability.

The coating composition is excellent in storage stability, curability, and coating workability, and can form a coating film excellent in coating performance such as erosion resistance, adhesiveness to an object to be coated, and chemical resistance, and thus, the coating composition can be particularly suitably used for coating industrial products such as components of large-sized machine/machinery such as transportation machine such as car bodies and vehicles, construction machinery and industrial machinery.

Examples of the object to be coated include a metal substrate and a plastic substrate.

The metal substrate is not particularly limited as long as the substrate is a metal, and examples thereof include metal materials such as magnesium, aluminum, zinc, titanium, iron, nickel, chromium, gold, silver, copper, tin, platinum, palladium, zirconium, tungsten and alloys of at least two or more of these metals. Examples of the metal materials such as alloys include alloyed zinc such as Zn—Al, Zn—Ni, and Zn—Fe, stainless steel, and steel plated with the above metal material(s).

Examples of the plastic substrate include polyolefin resins such as polyethylene resin and polypropylene resin; polyester resins such as polycarbonate, polyethylene terephthalate, polybutylene terephthalate, and polyethylene terephthalate/isophthalate; styrene resins such as styrene-butadiene block copolymers, styrene-acrylonitrile, acrylonitrile-butadiene-styrene (ABS), polystyrene, acrylonitrile-styrene-acrylate; acrylic resins such as polyamide resins such as nylon 6, nylon 6,6, nylon 6, 10, and metaxylylene adipamide, polymethyl methacrylate, and methyl methacrylate/ethyl acrylate; resins such as polyvinyl chloride resin, vinylidene chloride resin such as vinyl chloride-vinyl acetate, unsaturated polyester resin, phenol resin, melamine resin, urea resin, polyphenylene ether resin, polyoxymethylene resin, polyurethane resin, and epoxy resin; and plastic materials such as various fiber reinforced plastics (hereinafter may be abbreviated as FRP). The plastic substrate may be a hybrid resin of two or more kinds of resins.

The fiber reinforced plastic (FRP) is a material having strength improved by incorporating reinforcing fibers into plastic.

As the reinforcing fibers of FRP, any common reinforcing fibers such as glass fiber, aramid fiber, and carbon fiber may be used. The reinforcing fiber may be used alone or two or more thereof may be used in combination. In particular, when the glass fiber, the aramid fiber, and/or the carbon fiber is contained, the specific strength and the specific elastic modulus are excellent as compared to a plastic substrate. In order to obtain an FRP material having a light weight and excellent mechanical properties, it is preferable to use the glass fiber, the aramid fiber and/or the carbon fiber alone or in combination of two or more thereof.

As a matrix resin of FRP (also called a base resin, which is a plastic serving as a base material and a resin serving as a substrate after forming), examples thereof include resins described above as the plastic substrate, unsaturated polyester resins, phenol resins, and the like. In particular, among the matrix resins, an epoxy resin is suitable from the viewpoint of adhesiveness to reinforcing fibers, and any epoxy resin may be used as long as the resin is suitable for FRP forming. For the matrix resin, a curing agent may be used, and examples thereof include amine compounds, acid anhydride compounds, polyimide compounds, imidazole compounds, and the like.

The coating composition can be particularly suitably applied to a plastic substrate.

The metal substrate or various plastic substrates, components formed therefrom, and the like may be subjected to surface treatments such as degreasing, phosphate treatment, chromate treatment, complex oxide treatment, washing, and polishing using a detergent or a solvent, and an undercoat film may be further formed thereon.

The coating composition can be applied to the object by common methods such as a roll coating method, a spray coating method, a brush coating method, an electrostatic coating method, an immersion method, an electrodeposition coating method, a curtain coating method, or a roller coating method, followed by drying to form a coating film.

The thickness of the coating film by the coating composition is not particularly limited, but is usually 20 μm or more and preferably 50 μm or more, and is preferably 500 μm or less, and more preferably 300 μm or less.

The coating composition can be cured by baking. The heating and drying conditions during baking may be set as appropriate. The heating temperature is preferably 100° C. or more, preferably 110° C. or more, and more preferably 120° C. or more, and is preferably 150° C. or less. The heating time is preferably 60 minutes or more, and is preferably 180 minutes or less, more preferably 150 minutes or less, and more preferably 120 minutes or less. Examples of the heating device include a drying furnace blowing device, an infrared irradiation device, and the like. Further, preheating may be carried out preliminarily as necessary before heating.

Article Coated with Coating Composition

In addition, the present invention also relates to an article coated with the coating composition. As the coating composition, the above-described coating composition may be used, and preferable aspects are the same.

Examples of the article include an article including a metal substrate or a plastic substrate, as described above as the objects to be coated. Specific examples thereof include industrial products such as components of large-sized machine/machinery such as transportation machine such as vehicle bodies and vehicles, construction machinery, and industrial machinery, and machine/machinery itself.

Coating Method

In addition, the present invention relates to a coating method of coating an object with the coating composition prepared by mixing the main agent and the curing agent. The main agent includes a blocked urethane elastomer (A) containing a terminal isocyanate group blocked with an oxime compound and having a number average molecular weight of 800 to 5,000. As the blocked urethane elastomer (A), those described for the blocked urethane elastomer (A) in the above "coating composition" may be used, and preferable aspects are the same. The curing agent includes an aromatic diamine compound (B) containing an electron-donating group. As the aromatic diamine compound (B), those described for the aromatic diamine compound (B) in the above "coating composition" may be used, and preferable aspects are the same. In addition, the amide compound (C) in the above "coating composition" is included in at least one of the main agent and the curing agent. As the amide compound (C), those described for the amide compound (C) in the above "coating composition" may be used, and preferable aspects are the same.

In the coating method, the main agent and the curing agent are mixed so that an equivalent ratio (amino group/isocyanate group) of the amino group of the aromatic diamine compound (B) to the isocyanate group of the blocked urethane elastomer (A) is within a range of 1.0 to 2.0, and a solid content of the amide compound (C) is within a range of 0.5 mass % to 5 mass % based on a total solid content of the blocked urethane elastomer (A) and the aromatic diamine compound (B).

By using the coating method, an object including a metal substrate or plastic substrate, as described above as the objet to be coated in the "coating composition", can be coated.

EXAMPLES

Hereinafter, the present invention is described in more detail with reference to Preparation Examples, Examples, and Comparative Examples. However, the present invention is not limited thereto. In the examples, "parts" and "%" are based on mass unless otherwise specified. The thickness of the coating film is based on the cured coating film.

Preparation of Blocked Urethane Elastomer (A)

As described in the Preparation Examples 1 to 10 below, blocked urethane elastomers (A1 to A10) were prepared by using the following urethane elastomers A to I, respectively.

The Preparation Examples 1 to 10 are as follows.

Preparation Example 1

100 parts of urethane elastomer A and 58.4 parts of butyl acetate were added to a reaction vessel, and 8.3 parts of methyl ethyl ketone oxime were added such that the equivalent ratio (NCO/OH) of the terminal isocyanate groups to the OH groups was 0.7, and the mixture was allowed to react at 40° C. for 1 hour to obtain a blocked urethane elastomer (A1) having a solid content of 60 mass %.

Preparation Example 2

100 parts of urethane elastomer B and 59.0 parts of butyl acetate were added to a reaction vessel, and 7.7 parts of methyl ethyl ketone oxime were added such that the equivalent ratio of the terminal isocyanate group to the OH group was 0.7, and the mixture was allowed to react at 40° C. for 1 hour to obtain a blocked urethane elastomer (A2) having a solid content of 60 mass %.

Preparation Example 3

100 parts of urethane elastomer C and 54.2 parts of butyl acetate were added to a reaction vessel, 12.5 parts of methyl ethyl ketone oxime were added such that the equivalent ratio of the terminal isocyanate groups to the OH groups was 0.7, and the mixture was allowed to react at 40° C. for 1 hour to obtain a blocked urethane elastomer (A3) having a solid content of 60 mass %.

Preparation Example 4

100 parts of urethane elastomer D and 48.1 parts of butyl acetate were added to the reaction vessel, and 18.6 parts of methyl ethyl ketone oxime were added such that the equivalent ratio of the terminal isocyanate groups to the OH groups was 0.7, and the mixture was allowed to react at 40° C. for 1 hour to obtain a blocked urethane elastomer (A4) having a solid content of 60 mass %.

Preparation Example 5

100 parts of urethane elastomer E and 50.9 parts of butyl acetate were added to the a reaction vessel, and 15.8 parts of methyl ethyl ketone oxime ware added such that the equivalent ratio of the terminal isocyanate groups to the OH groups was 0.7, and the mixture was allowed to react at 40° C. for 1 hour to obtain a blocked urethane elastomer (A5) having a solid content of 60 mass %.

Preparation Example 6

100 parts of urethane elastomer F and 48.1 parts of butyl acetate were added to a reaction vessel, and 18.6 parts of methyl ethyl ketone oxime were added such that the equivalent ratio of the terminal isocyanate groups to the OH groups was 0.7, and the mixture was allowed to react at 40° C. for 1 hour to obtain a blocked urethane elastomer (A6) having a solid content of 60 mass %.

Preparation Example 7

100 parts of urethane elastomer G and 38.7 parts of butyl acetate were added to a reaction vessel, and 28.0 parts of methyl ethyl ketone oxime were added such that the equivalent ratio of the terminal isocyanate groups to the OH groups was 0.7, and the mixture was allowed to react at 40° C. for 1 hour to obtain a blocked urethane elastomer (A7) having a solid content of 60 mass %.

Preparation Example 8

100 parts of urethane elastomer H and 25.7 parts of butyl acetate were added to a reaction vessel, and 41.0 parts of methyl ethyl ketone oxime were added such that the equivalent ratio of the terminal isocyanate groups to the OH groups was 0.7, and the mixture was allowed to react at 40° C. for 1 hour to obtain a blocked urethane elastomer (A8) having a solid content of 60 mass %.

Preparation Example 9

100 parts of urethane elastomer I and 62.6 parts of butyl acetate were added to a reaction vessel, and 4.1 parts of methyl ethyl ketone oxime were added such that the equivalent ratio of the terminal isocyanate groups to the OH groups was 0.7, and the mixture was allowed to react at 40° C. for 1 hour to obtain a blocked urethane elastomer (A9) having a solid content of 60 mass %.

Preparation Example 10

100 parts of Urethane Elastomer A and 55.9 parts of butyl acetate were added to a reaction vessel, 10.8 parts of ε-caprolactam were added such that the equivalent ratio of the terminal isocyanate groups to the OH groups was 0.7, and the mixture was allowed to react at 40° C. for 1 hour to obtain a blocked urethane elastomer (A10) having a solid content of 60 mass %.

The urethane elastomers A to I are as follows.

Urethane elastomer A: PTMG-based (number average molecular weight (Mn)=3,000) TDI terminated elastomer, NCO content of 2.8 wt %

Urethane elastomer B: Ester-based (Mn=3,000) TDI terminated elastomers, NCO content of 2.6%

Urethane elastomer C: PTMG-based (Mn=2,000) TDI terminated elastomer, NCO content of 4.2%

Urethane elastomer D: PTMG-based (Mn=1,300) TDI terminated elastomer, NCO content of 6.3%

Urethane elastomer E: PTMG-based (Mn=1,600) MDI terminated elastomer, NCO content of 5.3%

Urethane elastomer F: PTMG-based (Mn=1,300) XDI terminal elastomer, NCO content of 6.3%

Urethane elastomer G: MDI terminated elastomer obtained by reacting PTMG (Mn=1,300) with TDI nurate and multimers thereof, NCO content 9.5%

Urethane elastomer H: PTMG-based (Mn=250) TDI terminated elastomer, NCO content of 14.0%

Urethane elastomer I: PTMG-based (Mn=6,000) TDI terminated elastomer, NCO content of 1.4%

Preparation of Coating Composition

Example 1

100 parts (solid content) of the blocked urethane elastomer (A1) obtained in Production Example 1, 2.0 parts (solid content) of carbon MA-100, 2.0 parts (solid content) of DISPARLON (registered trademark) A670-20M, 13.0 parts (solid content) of ACEMATT (registered trademark) TS-100, and 124.5 parts of butyl acetate were mixed, the dispersion was carried out in a sand mill to obtain a dispersion paste. The obtained dispersion paste was mixed with 0.5 parts (solid content) of Polyflow No. 50EHF, 0.002 parts (solid content) of DISPARLON (registered trademark) 1930 N, and 20 parts of butyl acetate while stirring with a disper to obtain a main agent of a coating composition No. 1 having a solid content of 34.7 mass %.

Next, 20 parts of CUREHARD (registered trademark) MED were dissolved in 80 parts of butyl acetate to obtain a curing agent of the coating composition No. 1. The curing agent was mixed with the main agent such that the amino groups was 1.3 equivalent with respect to the (block) isocyanate groups in the blocked urethane elastomer in the main agent, and butyl acetate was added thereto such that the solid content was 30 mass %, thereby obtaining the coating composition No. 1.

Examples 2 to 24 and Comparative Examples 1 to 12

Coating compositions No. 2 to No. 36 each having a solid content of 30 mass % were obtained in the same manner as in Example 1 except that the formulation of each component was changed as shown in Tables 1 to 3.

Each component blended in each coating composition No. 1 to No. 36 obtained in Examples 1 to 24 and Comparative Examples 1 to 12 is shown in Tables 1 to 3. Numerals in the column of blocked urethane elastomers (A1 to A10) in Tables are mass percent of each component based on each blocked urethane elastomer; those in the column of RC agent, pigment (D) and additive in Tables are mass percent (solid content) of each component based on each coating composition. In addition, although description is not made in Tables, mass percent (solid content) of blocked urethane elastomers (A1 to A10) in each coating composition is 100 parts. In this regard, however, in Comparative Example 3, non-blocked urethane elastomer A was used alone. In addition, the unit "eq" of the blended amount of the aromatic diamine compound (B) is equivalent ratio of amino group to isocyanate group.

TABLE 1

| | | | Examples No. | 1 | 2 | 3 | 4 | 5 | 6 | 7 |
|---|---|---|---|---|---|---|---|---|---|---|
| | | | Coating Composition No. | 1 | 2 | 3 | 4 | 5 | 6 | 7 |
| Main Agent | Blocked Urethane Elastomer (A1 to A10) | Blocked Urethane Polymer | | A1 | A2 | A3 | A4 | A5 | A6 | A7 |
| | | Urethane Elastomer | Urethane Elastomer A | 100 | | | | | | |
| | | | Urethane Elastomer B | | 100 | | | | | |
| | | | Urethane Elastomer C | | | 100 | | | | |
| | | | Urethane Elastomer D | | | | 100 | | | |
| | | | Urethane Elastomer E | | | | | 100 | | |
| | | | Urethane Elastomer F | | | | | | 100 | |
| | | | Urethane Elastomer G | | | | | | | 100 |
| | | | Urethane Elastomer H | | | | | | | |
| | | | Urethane Elastomer I | | | | | | | |
| | | Blocking Agent | methyl ethyl ketone oxime | 8.3 | 7.7 | 12.5 | 18.6 | 15.8 | 18.6 | 28.0 |
| | | | ε-caprolactam | | | | | | | |
| | RC Agent | Amide Compound (C) | DISPARLON 670-20M | 2.0 | 2.0 | 2.0 | 2.0 | 2.0 | 2.0 | 2.0 |
| | | | DISPARLON PFA-231 | | | | | | | |
| | | | DISPARLON PF-911 | | | | | | | |
| | Pigment (D) | Coloring Pigment | Carbon MA-100 | 2.0 | 2.0 | 2.0 | 2.0 | 2.0 | 2.0 | 2.0 |
| | | Extender Pigment | ACEMATT TS-100 | 13.0 | 13.0 | 13.0 | 13.0 | 13.0 | 13.0 | 13.0 |
| | Additive | Surface Conditioner | Polyflow No. 50EHF | 0.5 | 0.5 | 0.5 | 0.5 | 0.5 | 0.5 | 0.5 |
| | | Defoaming Agent | DISPARLON 1930 N | 0.002 | 0.002 | 0.002 | 0.002 | 0.002 | 0.002 | 0.002 |
| Curing Agent | Aromatic Diamine Compound (B) | | CUREHARD MED | 1.3 eq | 1.3 eq | 1.3 eq | 1.3 eq | 1.3 eq | 1.3 eq | 1.3 eq |
| | | | 2,4-tolylene diamine | | | | | | | |
| | | | ETHACURE 100 | | | | | | | |
| | | | m-xylene diamine | | | | | | | |
| | | | 2,4-diaminophenol | | | | | | | |
| | | | 4,4'-diamino-2,2'-dimethylbiphenyl | | | | | | | |
| | | | KAYAHARD A-A | | | | | | | |
| | | | 2,2',6,6'-tetramethyl-4,4'-diaminodiphenylmethane | | | | | | | |
| | | | 2,2',3,3',5,5'-hexamethyl-4,4'-diaminodiphenylmethane | | | | | | | |
| | | | o-toluidine | | | | | | | |
| | | | 3,3'-dichloro-4,4'-diaminodiphenylmethane | | | | | | | |
| | | | 1,6-hexane diamine | | | | | | | |
| Total Solid Content Ratio ((C)/(A) + (B)) (mass %) | | | | 1.9 | 1.9 | 1.8 | 1.7 | 1.8 | 1.7 | 1.6 |

| | | | Examples No. | 8 | 9 | 10 | 11 | 12 | 13 |
|---|---|---|---|---|---|---|---|---|---|
| | | | Coating Composition No. | 8 | 9 | 10 | 11 | 12 | 13 |
| Main Agent | Blocked Urethane Elastomer (A1 to A10) | Blocked Urethane Polymer | | A1 | A1 | A1 | A1 | A1 | A1 |
| | | Urethane Elastomer | Urethane Elastomer A | 100 | 100 | 100 | 100 | 100 | 100 |
| | | | Urethane Elastomer B | | | | | | |
| | | | Urethane Elastomer C | | | | | | |
| | | | Urethane Elastomer D | | | | | | |
| | | | Urethane Elastomer E | | | | | | |
| | | | Urethane Elastomer F | | | | | | |
| | | | Urethane Elastomer G | | | | | | |
| | | | Urethane Elastomer H | | | | | | |
| | | | Urethane Elastomer I | | | | | | |
| | | Blocking Agent | methyl ethyl ketone oxime | 8.3 | 8.3 | 8.3 | 8.3 | 8.3 | 8.3 |
| | | | ε-caprolactam | | | | | | |
| | RC Agent | Amide Compound (C) | DISPARLON 670-20M | 2.0 | 2.0 | 2.0 | 2.0 | 2.0 | 2.0 |
| | | | DISPARLON PFA-231 | | | | | | |
| | | | DISPARLON PF-911 | | | | | | |

TABLE 1-continued

| | | | | | | | | | |
|---|---|---|---|---|---|---|---|---|---|
| | Pigment (D) | Coloring Pigment | Carbon MA-100 | 2.0 | 2.0 | 2.0 | 2.0 | 2.0 | 2.0 |
| | | Extender Pigment | ACEMATT TS-100 | 13.0 | 13.0 | 13.0 | 13.0 | 13.0 | 13.0 |
| | Additive | Surface Conditioner | Polyflow No. 50EHF | 0.5 | 0.5 | 0.5 | 0.5 | 0.5 | 0.5 |
| | | Defoaming Agent | DISPARLON 1930 N | 0.002 | 0.002 | 0.002 | 0.002 | 0.002 | 0.002 |
| Curing Agent | Aromatic Diamine Compound (B) | | CUREHARD MED | | | | | | |
| | | | 2,4-tolylene diamine | 1.3 eq | | | | | |
| | | | ETHACURE 100 | | 1.3 eq | | | | |
| | | | m-xylene diamine | | | 1.3 eq | | | |
| | | | 2,4-diaminophenol | | | | 1.3 eq | | |
| | | | 4,4'-diamino-2,2'-dimethylbiphenyl | | | | | 1.3 eq | |
| | | | KAYAHARD A-A | | | | | | 1.3 eq |
| | | | 2,2',6,6'-tetramethyl-4,4'-diaminodiphenylmethane | | | | | | |
| | | | 2,2',3,3',5,5'-hexamethyl-4,4'-diaminodiphenylmethane | | | | | | |
| | | | o-toluidine | | | | | | |
| | | | 3,3'-dichloro-4,4'-diaminodiphenylmethane | | | | | | |
| | | | 1,6-hexane diamine | | | | | | |
| Total Solid Content Ratio ((C)/(A) + (B)) (mass %) | | | | 1.9 | 1.9 | 1.9 | 1.9 | 1.9 | 1.9 |

TABLE 2

| | | | | | | | | | |
|---|---|---|---|---|---|---|---|---|---|
| | | | Examples No. | 14 | 15 | 16 | 17 | 18 | 19 |
| | | | Coating Composition No. | 14 | 15 | 16 | 17 | 18 | 19 |
| Main Agent | Blocked Urethane Elastomer (A1 to A10) | Blocked Urethane Polymer | | A1 | A1 | A1 | A1 | A1 | A1 |
| | | Urethane Elastomer | Urethane Elastomer A | 100 | 100 | 100 | 100 | 100 | 100 |
| | | | Urethane Elastomer B | | | | | | |
| | | | Urethane Elastomer C | | | | | | |
| | | | Urethane Elastomer D | | | | | | |
| | | | Urethane Elastomer E | | | | | | |
| | | | Urethane Elastomer F | | | | | | |
| | | | Urethane Elastomer G | | | | | | |
| | | | Urethane Elastomer H | | | | | | |
| | | | Urethane Elastomer I | | | | | | |
| | | Blocking Agent | methyl ethyl ketone oxime | 8.3 | 8.3 | 8.3 | 8.3 | 8.3 | 8.3 |
| | | | ε-caprolactam | | | | | | |
| | RC Agent | Amide Compound (C) | DISPARLON 670-20M | 2.0 | 2.0 | 2.0 | 2.0 | 2.0 | 2.0 |
| | | | DISPARLON PFA-231 | | | | | | |
| | | | DISPARLON PF-911 | | | | | | |
| | Pigment (D) | Coloring Pigment | Carbon MA-100 | 2.0 | 2.0 | 2.0 | 2.0 | 2.0 | 2.0 |
| | | Extender Pigment | ACEMATT TS-100 | 13.0 | 13.0 | 13.0 | 13.0 | 13.0 | 13.0 |
| | Additive | Surface Conditioner | Polyflow No. 50EHF | 0.5 | 0.3 | 0.3 | 0.3 | 0.3 | 0.3 |
| | | Defoaming Agent | DISPARLON 1930 N | 0.002 | 0.002 | 0.002 | 0.002 | 0.002 | 0.002 |
| Curing Agent | Aromatic Diamine Compound (B) | | CUREHARD MED | | | | 1.9 eq | 1.03 eq | 1.6 eq | 1.08 eq |
| | | | 2,4-tolylene diamine ETHACURE 100 | | | | | | |
| | | | m-xylene diamine | | | | | | |
| | | | 2,4-diaminophenol | | | | | | |
| | | | 4,4'-diamino-2,2'-dimethylbiphenyl | | | | | | |
| | | | KAYAHARD A-A | | | | | | |
| | | | 2,2',6,6'-tetramethyl-4,4'-diaminodiphenylmethane | 1.3 eq | | | | | |
| | | | 2,2',3,3',5,5'-hexamethyl-4,4'-diaminodiphenylmethane | | 1.3 eq | | | | |
| | | | o-toluidine | | | | | | |
| | | | 3,3'-dichloro-4,4'-diaminodiphenylmethane | | | | | | |
| | | | 1,6-hexane diamine | | | | | | |
| Total Solid Content Ratio ((C)/(A) + (B)) (mass %) | | | | 1.9 | 1.9 | 1.9 | 1.8 | 1.9 | 1.8 |

| | | | | | | | | | |
|---|---|---|---|---|---|---|---|---|---|
| | | | Examples No. | 20 | 21 | 22 | 23 | 24 | |
| | | | Coating Composition No. | 20 | 21 | 22 | 23 | 24 | |
| Main Agent | Blocked Urethane Elastomer (A1 to A10) | Blocked Urethane Polymer | | A2 | A2 | A2 | A1 | A1 | |
| | | Urethane Elastomer | Urethane Elastomer A | | | | 100 | 100 | |
| | | | Urethane Elastomer B | 100 | 100 | 100 | | | |
| | | | Urethane Elastomer C | | | | | | |
| | | | Urethane Elastomer D | | | | | | |
| | | | Urethane Elastomer E | | | | | | |
| | | | Urethane Elastomer F | | | | | | |
| | | | Urethane Elastomer G | | | | | | |
| | | | Urethane Elastomer H | | | | | | |
| | | | Urethane Elastomer I | | | | | | |

TABLE 2-continued

| | | | | | | | |
|---|---|---|---|---|---|---|---|
| | Blocking Agent | methyl ethyl ketone oxime | 7.7 | 7.7 | 7.7 | 8.3 | 8.3 |
| | | ε-caprolactam | | | | | |
| RC Agent | Amide Compound (C) | DISPARLON 670-20M | | | | 2.0 | 2.0 |
| | | DISPARLON PFA-231 | 1.1 | 0.6 | 2.0 | | |
| | | DISPARLON PF-911 | | | | | |
| Pigment (D) | Coloring Pigment | Carbon MA-100 | 2.0 | 2.0 | 2.0 | 2.0 | 2.0 |
| | Extender Pigment | ACEMATT TS-100 | 13.0 | 13.0 | 13.0 | 3.0 | 1.0 |
| Additive | Surface Conditioner | Polyflow No. 50EHF | 0.3 | 0.3 | 0.3 | 0.3 | 0.3 |
| | Defoaming Agent | DISPARLON 1930 N | 0.002 | 0.002 | 0.002 | 0.002 | 0.002 |
| Curing Agent | Aromatic Diamine Compound (B) | CUREHARD MED | 1.3 eq | 1.3 eq | 1.3 eq | 1.3 eq | 1.3 eq |
| | | 2,4-tolylene diamine | | | | | |
| | | ETHACURE 100 | | | | | |
| | | m-xylene diamine | | | | | |
| | | 2,4-diaminophenol | | | | | |
| | | 4,4'-diamino-2,2'-dimethylbiphenyl | | | | | |
| | | KAYAHARD A-A | | | | | |
| | | 2,2',6,6'-tetramethyl-4,4'-diaminodiphenylmethane | | | | | |
| | | 2,2',3,3',5,5'-hexamethyl-4,4'-diaminodiphenylmethane | | | | | |
| | | o-toluidine | | | | | |
| | | 3,3'-dichloro-4,4'-diaminodiphenylmethane | | | | | |
| | | 1,6-hexane diamine | | | | | |
| Total Solid Content Ratio ((C)/(A) + (B)) (mass %) | | | 1.0 | 0.6 | 1.9 | 1.9 | 1.9 |

TABLE 3

| | | | | Examples No. | 1 | 2 | 3 | 4 | 5 | 6 | 7 |
|---|---|---|---|---|---|---|---|---|---|---|---|
| | | | | Coating Composition No. | 25 | 26 | 27 | 28 | 29 | 30 | 31 |
| Main Agent | Blocked Urethane Elastomer (A1 to A10) | Blocked Urethane Elastomer | Blocked Urethane Polymer | | A8 | A9 | | A10 | A1 | A1 | A1 |
| | | | Urethane Elastomer A | | | | 100 | 100 | 100 | 100 | 100 |
| | | | Urethane Elastomer B | | | | | | | | |
| | | | Urethane Elastomer C | | | | | | | | |
| | | | Urethane Elastomer D | | | | | | | | |
| | | | Urethane Elastomer E | | | | | | | | |
| | | | Urethane Elastomer F | | | | | | | | |
| | | | Urethane Elastomer G | | | | | | | | |
| | | | Urethane Elastomer H | | 100 | | | | | | |
| | | | Urethane Elastomer I | | | 100 | | | | | |
| | | Blocking Agent | methyl ethyl ketone oxime | | 41.0 | 4.1 | | | 8.3 | 8.3 | 8.3 |
| | | | ε-caprolactam | | | | | 10.8 | | | |
| RC Agent | Amide Compound (C) | | DISPARLON 670-20M | | 2.0 | 2.0 | 2.0 | 2.0 | 2.0 | 2.0 | 2.0 |
| | | | DISPARLON PFA-231 | | | | | | | | |
| | | | DISPARLON PF-911 | | | | | | | | |
| Pigment (D) | Coloring Pigment | | Carbon MA-100 | | 2.0 | 2.0 | 2.0 | 2.0 | 2.0 | 2.0 | 2.0 |
| | Extender Pigment | | ACEMATT TS-100 | | 13.0 | 13.0 | 13.0 | 13.0 | 13.0 | 13.0 | 13.0 |
| Additive | Surface Conditioner | | Polyflow No. 50EHF | | 0.5 | 0.5 | 0.5 | 0.5 | 0.5 | 0.5 | 0.5 |
| | Defoaming Agent | | DISPARLON 1930 N | | 0.002 | 0.002 | 0.002 | 0.002 | 0.002 | 0.002 | 0.002 |
| Curing Agent | Aromatic Diamine Compound (B) | | CUREHARD MED | | 1.3 eq | 1.3 eq | 1.3 eq | 1.3 eq | | | |
| | | | 2,4-tolylene diamine | | | | | | | | |
| | | | ETHACURE 100 | | | | | | | | |
| | | | m-xylene diamine | | | | | | | | |
| | | | 2,4-diaminophenol | | | | | | | | |
| | | | 4,4'-diamino-2,2'-dimethylbiphenyl | | | | | | | | |
| | | | KAYAHARD A-A | | | | | | | | |
| | | | 2,2',6,6'-tetramethyl-4,4'-diaminodiphenylmethane | | | | | | | | |
| | | | 2,2',3,3',5,5'-hexamethyl-4,4'-diaminodiphenylmethane | | | | | | | | |
| | | | o-toluidine | | | | | | 1.3 eq | | |
| | | | 3,3'-dichloro-4,4'-diaminodiphenylmethane | | | | | | | 1.3 eq | |
| | | | 1,6-hexane diamine | | | | | | | | 1.3 eq |
| Total Solid Content Ratio ((C)/(A) + (B)) (mass %) | | | | | | | | | | | |

| | | | | Examples No. | 8 | 9 | 10 | 11 | 12 |
|---|---|---|---|---|---|---|---|---|---|
| | | | | Coating Composition No. | 32 | 33 | 34 | 35 | 36 |
| Main Agent | Blocked Urethane Elastomer (A1 to A10) | Blocked Urethane Elastomer | Blocked Urethane Polymer | | A1 | A1 | A1 | A1 | A1 |
| | | | Urethane Elastomer A | | 100 | 100 | 100 | 100 | 100 |
| | | | Urethane Elastomer B | | | | | | |
| | | | Urethane Elastomer C | | | | | | |
| | | | Urethane Elastomer D | | | | | | |
| | | | Urethane Elastomer E | | | | | | |

TABLE 3-continued

| | | | | | | | | |
|---|---|---|---|---|---|---|---|---|
| | | | Urethane Elastomer F | | | | | |
| | | | Urethane Elastomer G | | | | | |
| | | | Urethane Elastomer H | | | | | |
| | | | Urethane Elastomer I | | | | | |
| | | Blocking Agent | methyl ethyl ketone oxime | 8.3 | 8.3 | 8.3 | 8.3 | 8.3 |
| | | | ε-caprolactam | | | | | |
| | RC Agent | Amide Compound (C) | DISPARLON 670-20M | 2.0 | 2.0 | 0.1 | 6.0 | |
| | | | DISPARLON PFA-231 | | | | | |
| | | | DISPARLON PF-911 | | | | | 2.0 |
| | Pigment (D) | Coloring Pigment | Carbon MA-100 | 2.0 | 2.0 | 2.0 | 1.0 | 2.0 |
| | | Extender Pigment | ACEMATT TS-100 | 13.0 | 13.0 | 13.0 | 13.0 | 13.0 |
| | Additive | Surface Conditioner | Polyflow No. 50EHF | 0.5 | 0.5 | 0.5 | 0.5 | 0.5 |
| | | Defoaming Agent | DISPARLON 1930 N | 0.002 | 0.002 | 0.002 | 0.002 | 0.002 |
| Curing Agent | Aromatic Diamine Compound (B) | | CUREHARD MED | 0.9 eq | 2.1 eq | 1.3 eq | 1.3 eq | 1..3 eq |
| | | | 2,4-tolylene diamine | | | | | |
| | | | ETHACURE 100 | | | | | |
| | | | m-xylene diamine | | | | | |
| | | | 2,4-diaminophenol | | | | | |
| | | | 4,4'-diamino-2,2'-dimethylbiphenyl | | | | | |
| | | | KAYAHARD A-A | | | | | |
| | | | 2,2',6,6'-tetramethyl-4,4'-diaminodiphenylmethane | | | | | |
| | | | 2,2',3,3',5,5'-hexamethyl-4,4'-diaminodiphenylmethane | | | | | |
| | | | o-toluidine | | | | | |
| | | | 3,3'-dichloro-4,4'-diaminodiphenylmethane | | | | | |
| | | | 1,6-hexane diamine | | | | | |
| Total Solid Content Ratio ((C)/(A) + (B)) (mass %) | | | | | | | 0.09 | 5.6 |

Each component used for preparing the coating compositions in Examples 1 to 24 and Comparative Examples 1 to 12 is described below.

Carbon MA-100: manufactured by Mitsubishi Chemical Corporation, oxidized carbon, average particle diameter of 0.02 μm DISPARLON (registered trademark) A670-20M: fatty acid amides, manufactured by Kusumoto Chemicals ACEMATT (registered trademark) TS-100: amorphous synthetic silica, manufactured by EVONIK Polyflow No. 50 EHF: acrylic surface conditioner, manufactured by Kyoeisha Chemical DISPARLON (registered trademark) 1930N: silicone-based defoaming agent, manufactured by Kusumoto Chemicals CUREHARD (registered trademark) MED: 3,3'-dimethyl-5,5'-diethyl-4,4¹-diaminodiphenylmethane, manufactured by Kumaichi Kogyo 2, 4-tolylene diamine: manufactured by Tokyo Chemical ETHACURE (registered trademark) 100: 3,5-diethyltoluene-2,4-diamine, manufactured by ALBEMARLE m-xylene diamine: manufactured by Tokyo Chemical 2,4-diaminophenol: manufactured by Fuji Film Wako Pure Chemical 4,4'-diamino-2,2'-dimethylbiphenyl: manufactured by Tokyo Chemical KAYAHARD (registered trademark) A-A: 4,4'-diamino-3,3'-dimethyldiphenylmethane, manufactured by Nippon Kayaku o-toluidine: manufactured by Tokyo Chemical 3,3'-dichloro-4,4'-diaminodiphenylmethane: manufactured by Tokyo Chemical 1,6-hexane diamine: manufactured by Tokyo Chemical DISPARLON (registered trademark) PFA-231: fatty acid amide, manufactured by Kusumoto Chemicals DISPARLON (registered trademark) PF-911: oxidized polyolefin, manufactured by Kusumoto Chemicals Storage Stability For each of the coating composition No. 1 to No. 36 obtained in Examples 1 to 24 and Comparative Examples 1 to 12, the main agent of each coating composition was placed in a sealed container and stored at 40° C. for 30 days. The viscosity before and after storage was measured by a B-type viscometer (DIGITAL VISMETRON, manufactured by Shibaura System) at 6 rotations/min (measurement temperature of 23° C.) and these were compared, and the thickening rate % (("viscosity after storage"—"initial viscosity")/"initial viscosity"×100) was calculated and evaluated based on the following criteria. AA and A represent acceptable levels. In Examples and Comparative Examples, the main agent of each coating composition is a main agent which was prepared based on the above procedure and included the blocked urethane elastomers (A1 to A10) or urethane elastomer, the amide compound (C) or the rheology control agent (RC agent), the pigment (D) and additives shown in Tables. In addition, each of the main agents in Examples 2 to 24 and Comparative Examples 1 to 12 was adjusted to have a solid content of 34.7 mass % as in Example 1, and the adjusted main agent was tested for the storage stability. The test results for the storage stability are shown in Table 4.

AA: Thickening ratio is less than 10%

A: Thickening ratio is 10% or more and less than 25%

B: Thickening ratio is 25% or more and less than 100%

C: Thickening ratio is 100% or more

Preparation of Test Plate

Each test plate used for each performance test and performance evaluation was prepared in the following manner for each of the coating compositions No. 1 to No. 36 obtained in Examples 1 to 24 and Comparative Examples 1 to 12.

Test Plate I (for Erosion Resistance Test)

Figure 1A:
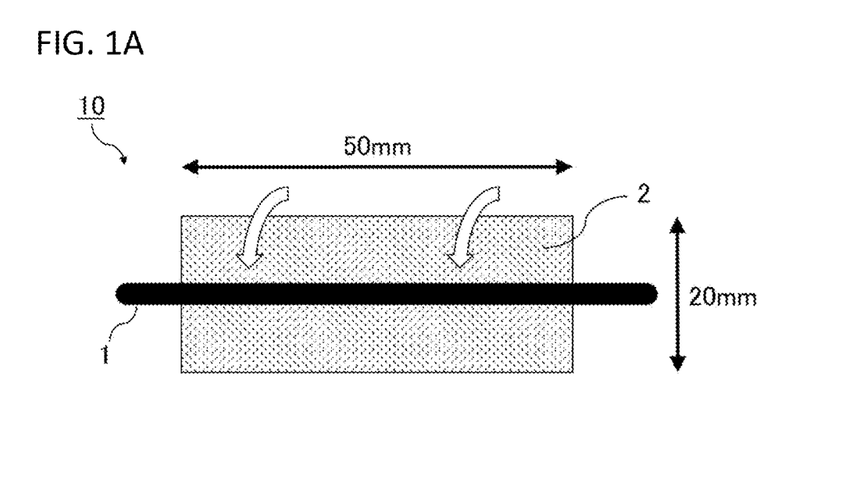
FIG. 1A to FIG. 1C include diagrams showing a process for preparing a test plate for an erosion resistance test and a schematic cross-sectional view of a completed test plate obtained.
Figure 1B:
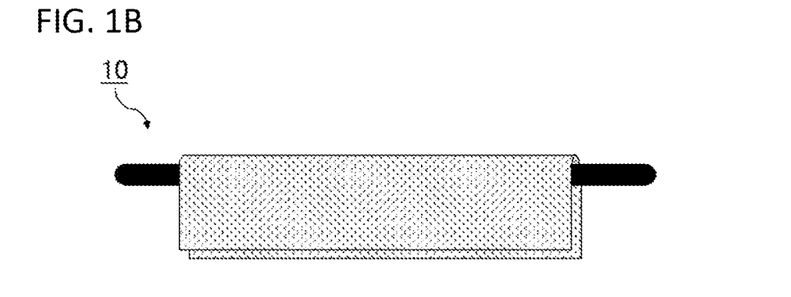
Figure 1C:
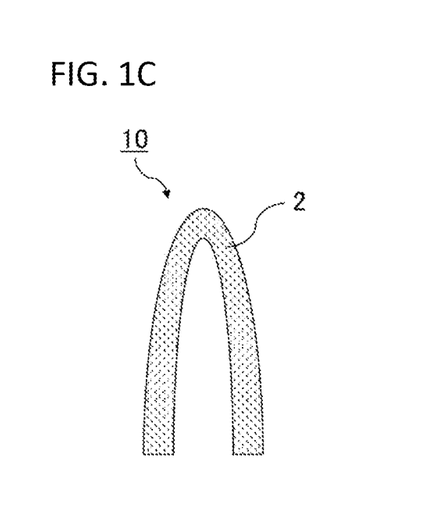

A blasted CFRP (carbon fiber reinforced plastic) plate or an aluminum plate 2 (material) having a size of 50 mm×20 mm and a thickness of 2 mm was degreased with isopropyl alcohol, and a round bar 1 having a diameter of 3 mm, which was bent in half, as shown in FIG. 1A and FIG. 1B was used as a material of a test material 10 for erosion resistance test. FIG. 1C shows a schematic sectional view of the material, viewed from axis of rotation of the round bar 1.

Figure 2A:
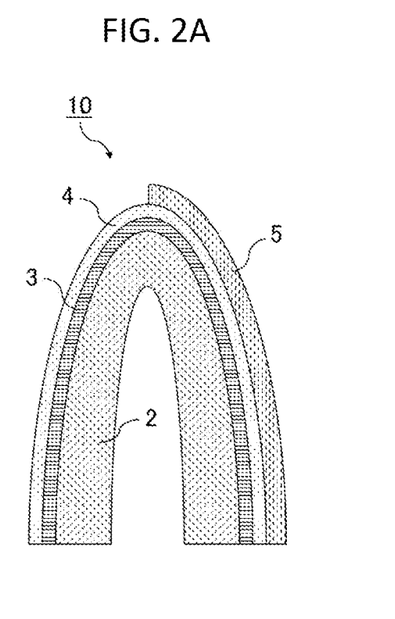
FIG. 2A to FIG. 2C includes diagrams showing a process for preparing a test plate for an erosion resistance test and a configuration view of a multilayer coating film.

As shown in FIG. 2A, the material was coated with a primer coating composition 3 by spray coating so as to have a cured film thickness of 20 μm, followed by holding at 23° C. for 15 minutes, and then, it was cured at 82° C. for 20 minutes. After cooling to room temperature, the intermediate coating composition 4 was applied by spray coating so as to have a cured film thickness of 15 μm, followed by holding at 23° C. for 15 minutes, and then, it was cured at 120° C. for 15 minutes.

Figure 2B:
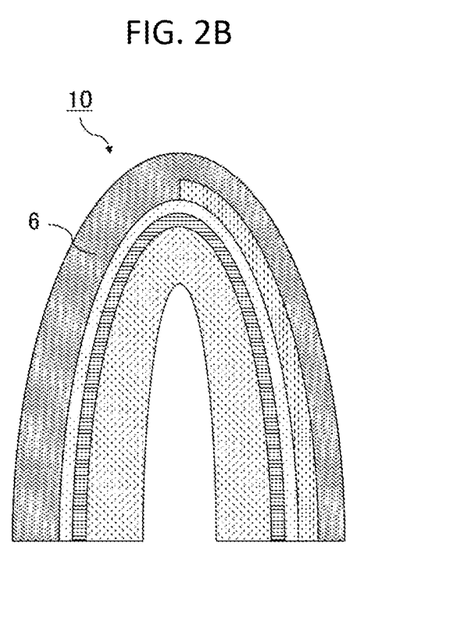
Figure 2C:
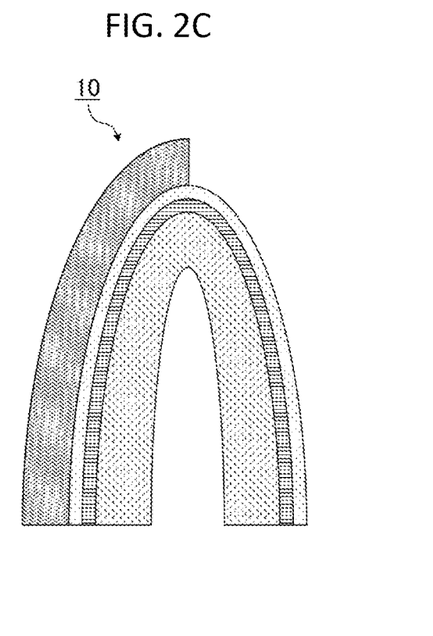

After one surface of the substrate coated with the intermediate coating composition was masked with a masking tape 5 as shown in FIG. 2A, each coating composition 6 was applied by spray coating such that the cured film thickness was 150 μm (FIG. 2B). Immediately after the coating, the masking tape 5 was peeled off, followed by holding at 23° C. for 60 minutes, and then, it was cured at 120° C. for 120 minutes to obtain each of the test plates 10 (Test Plate I) for erosion resistance test (FIG. 2C). Each combination of the coating composition used and the material is described in Table 4.

The primer coating composition and intermediate coating composition used for the preparation of the test plate I are as follows. The same primer coating composition and intermediate coating composition were used for the preparation of the test plate II.

Primer coating composition: solvent-based two-component coating composition, main agent: including epoxy resin of bisphenol A skeleton having an epoxy value of 2.2 mgKOH/g per solid content, and a mica pigment 40% (pigment weight concentration (PWC)), curing agent: modified aliphatic polyamine adduct having an amine value of 410 mgKOH/g, and an active hydrogen equivalent ratio of epoxy group/amino group of 1.0

Intermediate coating composition: a solvent-based one-component coating composition, a coating composition prepared by dissolving 60 mass % of phenol resin AP-101 and 40 mass % of polyvinyl butyral resin ESREC (registered trademark) BM-1 in a solvent obtained by mixing methyl ethyl ketone with cyclohexanone at a ratio of 1/1, and adjusting the solid content to 10%.

AP-101: manufactured by Aica Kogyo, resol phenolic resin, number average molecular weight of 750

ESREC (registered trademark) BM-1: manufactured by Sekisui Chemical, polyvinyl butyral resin, molecular weight of 40,000, a hydroxyl group of 34 mol %, an acetyl group of 3 mol % or less, a degree of butyralization of 65 mol %, a glass transition temperature of 67° C.

Test Plate II (for Adhesiveness Test)

Figure 3A:
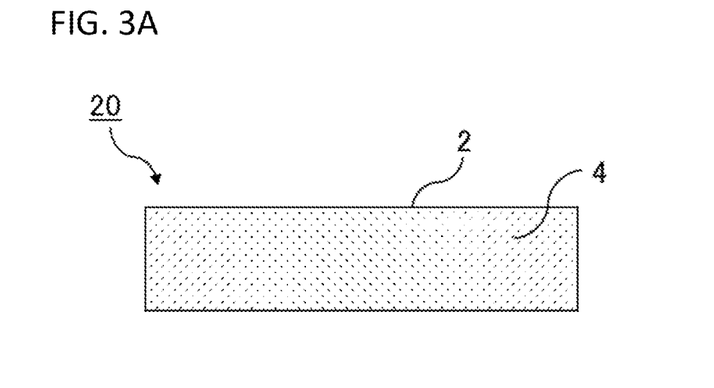
FIG. 3A to FIG. 3C schematically show a process for preparing a test plate for an adhesiveness test.
Figure 3B:
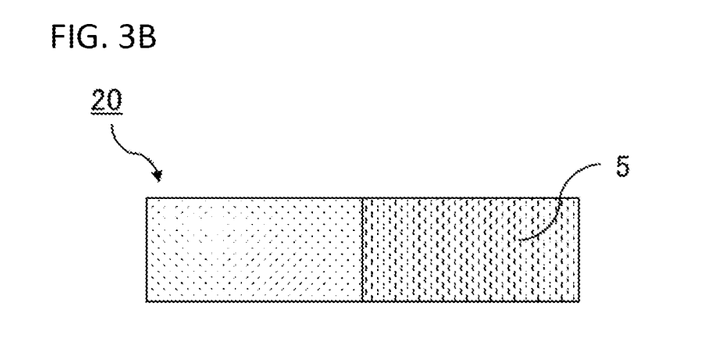
Figure 3C:
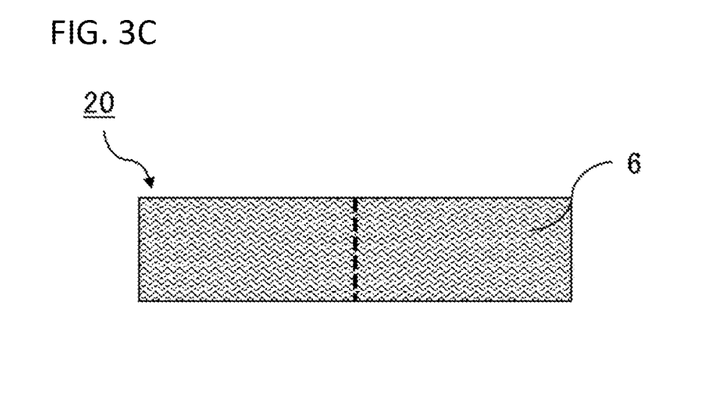

As shown in FIG. 3A to FIG. 3C, the blasted CFRP plate or aluminum plate 2 (material) having a size of 150 mm×20 mm and a thickness of 4 mm was degreased with isopropyl alcohol to prepare a test material. The test material was coated with a primer coating composition 3 by spray coating so as to have a cured film thickness of 20 μm, followed by holding at 23° C. for 15 minutes, and then, it was cured at 82° C. for 20 minutes. After cooling to room temperature, the intermediate coating composition 4 was applied by spray coating so as to have a cured film thickness of 15 μm, followed by holding at 23° C. for 15 minutes, and then, it was cured at 120° C. for 15 minutes.

Thereafter, as shown in FIG. 3A to FIG. 3C, a masking tape 5 (polyester tape 1272 manufactured by 3M) was applied to the half surface of the intermediate coating surface (75 mm width out of the 150 min width) for masking.

Each coating composition 6 was applied by spray coating onto the test material to which the intermediate coating composition had been applied and whose half surface was masked, such that the cured film thickness was 150 mm, followed by holding at 23° C. for 60 minutes, and then, it was cured at 120° C. for 120 minutes to obtain each of the test plates 20 (Test Plate II) for adhesiveness test. Each combination of the coating composition used and the material is described in Table 4.

Test Plate III (for Sagging Resistance Test)

A tin plate degreased using isopropyl alcohol, the tin plate having 150 mm×450 mm×0.3 mm, was used as a test substrate. After applying a masking tape having a width of 24 mm (24 mm out of 150 mm length) to the lower end of the tin plate, each coating composition was applied by spray coating to the above-mentioned substrate placed vertically such that the cured film thickness had an inclined thickness of 100 μm to 300 the masking tape was peeled off immediately after coating, and the substrate was set in a vertical state at 23° C. for 60 minutes, then the substrates were cured at 120° C. for 120 minutes in a vertical state to obtain the test plates (Test Plate III) for sagging resistance test.

Performance Test and Performance Evaluation

Using each test plate obtained in the preparation of the test plates, each coating composition was evaluated for performance in accordance with the following test method. The test results are shown in Table 4. In the test results, "AA", "A", and "AB" are acceptable levels.

Coating Performance (Erosion Resistance)

Each of the test plates 10 (Test Plate I; FIG. 2C) for erosion resistance was placed such that a portion of each of the test plates I1 to 136 coated with each coating composition faced upper part on a rotating blade of a simple rain erosion tester, and the water droplets at a water temperature of 2° C. were dropped by the shower, and the water droplets were collided with a flow rate of 53.4 ml/min by rotating at a speed of 75 rps. The degree of scratch and peeling was visually observed for each 30 minutes of operation and evaluated based on the following criteria.

AA: The size of the scratch after operation for 60 minutes was small, and the base was not exposed, A: The size of the scratch after operation for 60 minutes was small, but the base was exposed, AB: The size of the scratch after operation for 30 minutes was small, and the base was not exposed, B: The size of the scratch after operation for 30 minutes was large, and the base was exposed, C: The size of the scratch after operation for 30 minutes was considerably large, and the base was largely exposed.

Coating Performance (Adhesiveness)

Figure 4A:
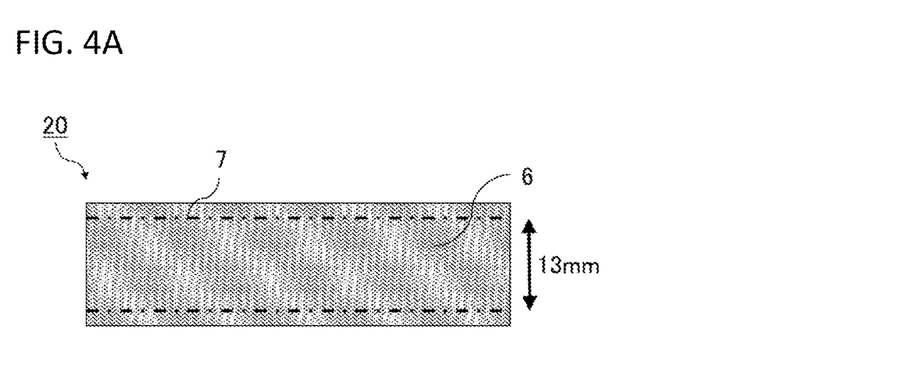
FIG. 4A to FIG. 4B schematically show a state of performing an adhesiveness tensile test.
Figure 4B:
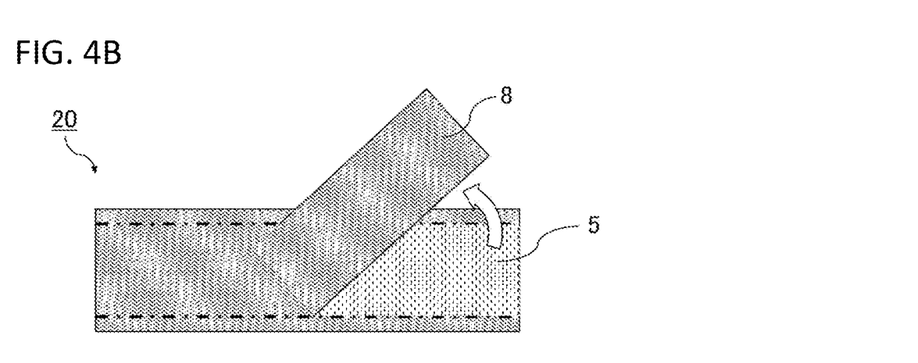

Each of the test plates 20 (Test Plate II) for adhesiveness test was cut by a cutter to obtain a notch having a width of 13 mm as shown in the dash-dot-dash line in FIG. 4A, a coated film portion (FIG. 4B) peeled from the masking tape 5 by a floating roller method (JIS K6854-1999) using a floor type precision universal tester AUTOGRAPH (registered trademark) AGS-Xplus series 20 kN (manufactured by Shirnadzu Corporation) was installed on the jaw as a gripping portion 8, the tensile test was carried out at a tensile speed of 152 mm/min at a temperature of 23° C. to measure peel strength or breaking strength, and then, evaluation was made based on the following criteria.

AA: Breaking strength was 40 N or more (without peeling off)
A: Breaking strength was 25 N or more and less than 40 N (without peeling off)
AB: Peel strength was 25 N or more
B: Peel strength was 15 N or more and less than 25 N
C: Peel strength was less than 15N Coating Workability (Sagging Resistance)

A portion of each of the test plates III where a sagging of 1 cm or more was observed at the boundary between the coated portion and the masking portion was defined as the sagging limit film thickness, and evaluation was made based on the following criteria.

AA: 250 μm or more
A: 200 μm or more and less than 250 μm
AB: 150 μm or more and less than 200 μm
B: 100 μm or more and less than 150 μm
C: less than 100 μm Coating Workability (Working Life)

Each of the coating compositions No. 1 to No. 36 in which the main agent, curing agent and diluent were mixed was allowed to stand at 23° C. and the time until gelation was measured, and evaluation was made based on the following criteria.

AA: 12 hours or more
A: 4 hours or more and less than 12 hours
B: 1 hour or more and less than 4 hours
C: less than 1 hour

TABLE 4

| | | Coating Composition No. | Coating Film Forming Method | Material | Cured Film Thickness (μm) | Erosion Resistance | Storage Stability (Main Agent) | Adhesiveness | Coating Workability Sagging Resistance | Working Life |
|---|---|---|---|---|---|---|---|---|---|---|
| Examples | 1 | 1 | Air Spray | CFRP | 150 | AA | AA | AA | A | AA |
| | 2 | 2 | | | 150 | A | AA | AA | A | AA |
| | 3 | 3 | | | 150 | AA | AA | AA | A | AA |
| | 4 | 4 | | | 150 | A | AA | AA | A | AA |
| | 5 | 5 | | | 150 | A | AA | AA | A | AA |
| | 6 | 6 | | | 150 | A | AA | A | A | AA |
| | 7 | 7 | | | 150 | A | AA | AB | A | AA |
| | 8 | 8 | | | 150 | AA | AA | A | A | AA |
| | 9 | 9 | | | 150 | AA | AA | A | A | AA |
| | 10 | 10 | | | 150 | AA | AA | A | A | AA |
| | 11 | 11 | | | 150 | AA | AA | AB | A | AA |
| | 12 | 12 | | | 150 | AA | AA | A | A | AA |
| | 13 | 13 | | | 150 | AA | AA | A | A | AA |
| | 14 | 14 | | | 150 | AA | AA | A | A | AA |
| | 15 | 15 | | | 150 | AA | AA | A | A | AA |
| | 16 | 16 | | | 150 | AB | AA | AB | A | AA |
| | 17 | 17 | | | 150 | AB | AA | AB | A | AA |
| | 18 | 18 | | | 150 | A | AA | A | A | AA |
| | 19 | 19 | | | 150 | A | AA | A | A | AA |
| | 20 | 20 | | | 150 | A | AA | AA | A | AA |
| | 21 | 21 | | | 150 | A | AA | AA | AB | AA |
| | 22 | 22 | | | 150 | A | AA | AA | AA | AA |
| | 23 | 23 | | | 150 | AA | AA | A | A | AA |
| | 24 | 24 | | | 150 | AA | AA | AB | A | AA |
| | 25 | 1 | | Aluminum | 150 | AA | AA | AA | A | AA |
| | 26 | 3 | | | 150 | AA | AA | AA | A | AA |
| | 27 | 4 | | | 150 | A | AA | AA | A | AA |
| Comparative Examples | 1 | 25 | Air Spray | CFRP | 150 | C | AA | AA | A | AA |
| | 2 | 26 | | | 150 | C | AA | AA | A | AA |
| | 3 | 27 | | | 150 | AA | C | AA | A | C |
| | 4 | 28 | | | 150 | C | AA | C | A | AA |
| | 5 | 29 | | | 150 | C | AA | C | A | AA |
| | 6 | 30 | | | 150 | C | AA | C | A | AA |
| | 7 | 31 | | | 150 | C | AA | C | A | AA |
| | 8 | 32 | | | 150 | C | AA | C | A | AA |
| | 9 | 33 | | | 150 | C | AA | C | A | AA |
| | 10 | 34 | | | 150 | AA | AA | AA | C | AA |
| | 11 | 35 | | | 150 | C | AA | AA | A | C |
| | 12 | 36 | | | 150 | AA | AA | AA | C | AA |

INDUSTRIAL APPLICABILITY

The coating composition is excellent in storage stability, curability, coating workability, and can provide a coating filing having excellent coating performance such as adhesiveness to an article to be coated and chemical resistance. Thus, the coating composition can be suitably used for coating industrial products such as components of large-scale equipment such as transportation equipment for vehicle bodies and vehicles, construction machinery and industrial machinery, and the coating composition can provide the lasting effect by the coating film.

DESCRIPTION OF REFERENCE NUMERALS AND SIGNS

1: Round bar
2: CFRP plate or aluminum plate
3: Primer coating composition
4: Intermediate coating composition
5: Masking tape
6: Coating composition
7: Notch
8: Gripping portion
10: Test plate for erosion resistance test
20: Test plate for adhesiveness test

The invention claimed is:

1. A coating composition, comprising: a blocked urethane elastomer (A) containing a terminal isocyanate group blocked with an oxime compound and having a number average molecular weight of 800 to 5,000; an aromatic diamine compound (B) containing an electron-donating group; and an amide compound (C),
    wherein an equivalent ratio (amino group/isocyanate group) of an amino group of the aromatic diamine compound (B) to an isocyanate group of the blocked urethane elastomer (A) is within a range of 1.0 to 2.0,
    a solid content of the amide compound (C) is within a range of 0.5 mass % to 5 mass % based on a total solid content of the blocked urethane elastomer (A) and the aromatic diamine compound (B), and
    the amount of the oxime compound is such that a functional group in the oxime compound that reacts with the isocyanate group to block the isocyanate group is at least the same amount as the isocyanate group.

2. An article coated with the coating composition according to claim 1.

3. A coating method, comprising coating an object with a coating composition obtained by mixing a main agent and a curing agent,
    wherein the main agent includes a blocked urethane elastomer (A) containing a terminal isocyanate group blocked with an oxime compound and having a number average molecular weight of 800 to 5,000,
    the curing agent includes an aromatic diamine compound (B) containing an electron-donating group,
    an amide compound (C) is contained in at least one of the main agent and the curing agent,
    an equivalent ratio (amino group/isocyanate group) of an amino group of the aromatic diamine compound (B) to an isocyanate group of the blocked urethane elastomer (A) is within a range of 1.0 to 2.0,
    a solid content of the amide compound (C) is within a range of 0.5 mass % to 5 mass % based on a total solid content of the blocked urethane elastomer (A) and the aromatic diamine compound (B), and
    the amount of the oxime compound is such that a functional group in the oxime compound that reacts with the isocyanate group to block the isocyanate group is at least the same amount as the isocyanate group.

* * * * *